United States Patent
Okamoto et al.

(10) Patent No.: US 11,876,172 B2
(45) Date of Patent: Jan. 16, 2024

(54) ALL-SOLID BATTERY AND METHOD FOR PRODUCING THE SAME

(71) Applicant: HITACHI ZOSEN CORPORATION, Osaka (JP)

(72) Inventors: Hidetake Okamoto, Osaka (JP); Shunji Kinoshita, Osaka (JP); Risa Nagai, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 432 days.

(21) Appl. No.: 16/481,284

(22) PCT Filed: Jan. 23, 2018

(86) PCT No.: PCT/JP2018/002028
§ 371 (c)(1),
(2) Date: Jul. 26, 2019

(87) PCT Pub. No.: WO2018/143022
PCT Pub. Date: Aug. 9, 2018

(65) Prior Publication Data
US 2020/0044283 A1 Feb. 6, 2020

(30) Foreign Application Priority Data

Jan. 31, 2017 (JP) .................. 2017-016139

(51) Int. Cl.
*H01M 10/0585* (2010.01)
*H01M 4/62* (2006.01)
*H01M 10/0562* (2010.01)

(52) U.S. Cl.
CPC ......... *H01M 10/0562* (2013.01); *H01M 4/62* (2013.01); *H01M 10/0585* (2013.01)

(58) Field of Classification Search
None
See application file for complete search history.

(56) References Cited

U.S. PATENT DOCUMENTS

| 2011/0123868 A1 | 5/2011 | Kawaoka et al. |
| 2012/0015234 A1* | 1/2012 | Iwaya ............... H01M 4/62 |
| | | 429/152 |

(Continued)

FOREIGN PATENT DOCUMENTS

| EP | 3576192 A1 | 4/2019 |
| EP | 3576208 A1 | 4/2019 |

(Continued)

OTHER PUBLICATIONS

Extended European Search Report dated Oct. 23, 2020 issued in corresponding European Patent Application No. 18748506.5 (8 pgs.).

(Continued)

*Primary Examiner* — Osei K Amponsah
(74) *Attorney, Agent, or Firm* — Pillsbury Winthrop Shaw Pittman, LLP (57) ABSTRACT

An all-solid battery includes at least a unit cell including a positive electrode, a negative electrode, and an ion-conductive solid electrolyte layer interposed between the positive electrode and the negative electrode. The solid electrolyte layer includes an inorganic solid electrolyte, and a resistance R1 of the unit cell when the pressure applied in a thickness direction of the unit cell is 100 kPa is 90 $\Omega cm^2$ or less.

4 Claims, 1 Drawing Sheet

(56) References Cited

U.S. PATENT DOCUMENTS

| | | |
|---|---|---|
| 2014/0162113 A1 | 6/2014 | Ohta et al. |
| 2015/0171478 A1* | 6/2015 | Suzuki .............. H01M 10/0585 |
| | | 29/623.1 |
| 2015/0188195 A1* | 7/2015 | Matsushita ....... H01M 10/0565 |
| | | 29/623.5 |
| 2015/0207177 A1 | 7/2015 | Ose et al. |
| 2016/0036091 A1 | 2/2016 | Ohtomo et al. |
| 2017/0207440 A1* | 7/2017 | Hama ................. H01M 50/581 |

FOREIGN PATENT DOCUMENTS

| | | |
|---|---|---|
| JP | 2009-193802 A | 8/2009 |
| JP | 2012-048853 A | 3/2012 |
| JP | 2012-146395 A | 8/2012 |
| JP | 2013-020837 A | 1/2013 |
| JP | 2013-125636 A | 6/2013 |
| JP | 2016-035867 A | 3/2016 |
| WO | 2012/176808 A1 | 12/2012 |
| WO | 2014/016907 A1 | 1/2014 |

OTHER PUBLICATIONS

International Search Report PCT/JP2018/002028 dated Apr. 17, 2018 with English translation.
Notice of Reasons for Refusal dated Mar. 2, 2021, issued in corresponding Japanese Patent Application No. 2017-016139 with English translation (12 pgs.).
Request for the Submission of an Opinion dated May 27, 2022 issued in corresponding Korean Patent Application No. 10-2019-7023586 with English translation (10 pgs.).

\* cited by examiner

ALL-SOLID BATTERY AND METHOD FOR PRODUCING THE SAME

CROSS-REFERENCE TO RELATED APPLICATIONS

This is the U.S. National Stage of PCT/JP2018/002028, filed Jan. 23, 2018, which in turn claims priority to Japanese Patent Application No. 2017-016139, filed Jan. 31, 2017, the contents of each of these applications being incorporated herein by reference in their entireties.

TECHNICAL FIELD

The present invention relates to an all-solid battery including a solid electrolyte layer.

BACKGROUND ART

Among various secondary batteries that are currently under development, lithium ion secondary batteries (LIBs) for which a high energy density can be easily achieved are regarded as most promising. Meanwhile, with the increasing range of uses of batteries, large batteries such as automobile batteries and stationary batteries are attracting attention. For large batteries, it is even more important to ensure safety than for small batteries. It is expected that the ensuring of safety and the capacity increase can be more easily achieved for all-solid batteries using an inorganic solid electrolyte than for LIBs using an electrolytic solution, even when the battery size is increased.

In general, an all-solid battery has an electrode group including a positive electrode, a negative electrode, and a solid electrolyte layer interposed therebetween. The solid electrolyte layer includes a solid electrolyte, and each of the positive electrode and the negative electrode includes an active material and a solid electrolyte. In such an all-solid battery, interface reactions all occur at solid-solid interfaces such as an interface between a solid electrolyte and an active material, and an interface between solid electrolytes. Accordingly, the performance of the all-solid battery is significantly affected by the contact resistance at solid-solid interfaces, unlike that of a battery using an electrolytic solution.

For this reason, conventionally, a low solid-solid interface resistance has been ensured for all-solid batteries by restraining the electrode group and the battery at a pressure of several MPa to several tens of MPa (PTL 1, PTL 2, etc.).

CITATION LIST

Patent Literatures

[PTL 1] Japanese Laid-Open Patent Publication No. 2012-48853
[PTL 2] WO 2014/016907A

SUMMARY OF INVENTION

Technical Problem

To restrain the electrode group or the battery at a pressure of several MPa to several tens of MPa, it is necessary to use a pressure restraining jig having a considerable weight or volume. On the other hand, when the electrode group or the battery is not restrained, the resistance at a solid-solid interface increases, making it impossible to cause a battery reaction.

Solution to Problem

An aspect of the present invention relates to an all-solid battery including: at least a unit cell including a positive electrode, a negative electrode, and an ion-conductive solid electrolyte layer interposed between the positive electrode and the negative electrode,
wherein the solid electrolyte layer includes an inorganic solid electrolyte, and
a resistance R1 of the unit cell when a pressure applied in a thickness direction of the unit cell is 100 kPa is 90 $\Omega cm^2$ or less.

Another aspect of the present invention relates to a method for producing an all-solid battery, including the steps of:
forming an electrode group including at least a unit cell including a positive electrode, a negative electrode, and a solid electrolyte layer being interposed between the positive electrode and the negative electrode and including an ion-conductive inorganic solid electrolyte; and
pressurizing the electrode group to plastically deform the inorganic solid electrolyte,
wherein, in the step of forming the electrode group, the solid electrolyte layer is formed by using the inorganic solid electrolyte by a dry process, and
a resistance R1 of the unit cell when a pressure applied in a thickness direction of the unit cell is 100 kPa is 90 $\Omega cm^2$ or less.

Advantageous Effects of Invention

Even when the electrode group or the battery is not restrained, or the pressure for restraining the electrode group or the battery is small in an all-solid battery, it is possible to reduce the solid-solid interface resistance. Accordingly, it is possible to ensure a high capacity.

While the novel features of the invention are set forth in the appended claims, the invention, both as to organization and content, will be better understood and appreciated, along with other objects and features thereof, from the following detailed description taken in conjunction with the drawing.

DESCRIPTION OF EMBODIMENT

An all-solid battery according to an embodiment of the present invention includes at least a unit cell including a positive electrode, a negative electrode, and an ion-conductive solid electrolyte layer interposed between the positive electrode and the negative electrode. The solid electrolyte layer includes an inorganic solid electrolyte, and a resistance R1 of the unit cell when the pressure applied in a thickness direction of the unit cell is 100 kPa is 90 $\Omega cm^2$ or less.

An embodiment of the present invention also includes a method for producing an all-solid battery, including the steps of: forming an electrode group including at least a unit cell including a positive electrode, a negative electrode, and a solid electrolyte layer being interposed between the positive electrode and the negative electrode and including an ion-conductive inorganic solid electrolyte; and pressurizing the electrode group to plastically deform the inorganic solid electrolyte. In the step of forming the electrode group, the solid electrolyte layer is formed by using the inorganic solid electrolyte by a dry process. In the all-solid battery, a resistance R1 of the unit cell when the pressure applied in a thickness direction of the unit cell is 100 kPa is 90 $\Omega cm^2$ or less.

According to the present embodiment, a solid electrolyte layer is formed by a dry process using an inorganic solid electrolyte. Therefore, when pressurizing the electrode group or the battery, the particles of the solid electrolyte are plastically deformed so as to be densely filled in the solid electrolyte layer, thus making it possible to reduce the gap between the particles. It is possible to increase the adhesion of the interface between the particles of the inorganic solid electrolyte, and the interface between the electrodes and the inorganic solid electrolyte particles (or the solid electrolyte layer), under atmospheric pressure, without applying a pressure to the electrode group or the battery using a restraining jig. Thus, it is possible to reduce the resistance at these solid-solid interfaces. In the battery in a state in which a restraining jig is not used, the pressure applied in the thickness direction of the unit cell is about 100 kPa. In the all-solid battery according to the present embodiment, the resistance R1 of the unit cell is small (i.e., the bulk resistance of the solid electrolyte layer and the reaction resistance of the electrodes are small) even at such a very small pressure, and it is therefore possible to cause a battery reaction, without using a restraining jig. Since it is not necessary to use a restraining jig, the volume occupied by the electrodes and so forth can be increased, so that it is possible to increase the energy density of the battery.

In the present embodiment, the solid electrolyte particles can be brought into close contact with each other through pressurization when producing the electrode group or the battery. Accordingly, after completion of the battery, the resistance of the unit cell (the bulk resistance of the solid electrolyte layer and the reaction resistance of the electrodes) will not change very much with the magnitude of the pressure applied in the thickness direction of the unit cell. For example, when the battery is restrained with a restraining jig, a pressure of about 60 MPa is applied to the unit cell, and the difference between the resistance of the unit cell at this time and the resistance of the unit cell when the battery is not restrained is small. The increase rate of the resistance R1 of the unit cell when the pressure applied in the thickness direction of the unit cell is 100 kPa to a resistance R2 of the unit cell when the pressure applied in the thickness direction of the unit cell (=(R1−R2)/R2×100) is 60 MPa is, for example, 10% or less, preferably 5% or less, more preferably 2% or less.

Note that the resistance R1 of the unit cell can be determined by standardizing the resistance measured by an AC impedance method with the area (specifically, the projected area in the thickness direction) of the positive electrode, in a state in which a pressure of 100 kPa is applied in the thickness direction of a unit cell that has been taken out from an all-solid battery. For example, first, the unit cell is charged to a maximum charge voltage with 0.1 C under a temperature environment of 25° C. After a rest period of 30 minutes, the AC impedance of the unit cell with a pressure of 100 kPa applied thereto is measured under a temperature environment of 25° C., using a frequency response analyzer with an applied voltage of 10 mV for a frequency range of 10 Hz or more and 1.0 MHz or less. Then, R1 cab be determined by estimating the bulk resistance of the solid electrolyte layer and the reaction resistance of the electrodes from a point of intersection with the real axis (i.e., the horizontal axis) and the size of the semicircle, respectively, on the high-frequency side of a Cole-Cole plot, and standardizing the sum of the resistances with the area of the positive electrode. The resistance R2 can be measured in the same manner as in the case of R1, except that the measurement is performed with a pressure of 60 MP applied in the thickness direction of the unit cell.

As used herein, the resistance of the unit cell is referenced for the purpose of indirectly evaluating the bulk resistance of the solid electrolyte layer and the reaction resistance of the electrodes. A unit cell means a battery (cell) set including one positive electrode, one negative electrode, and a solid electrolyte layer interposed therebetween. When the all-solid battery includes a plurality of positive electrodes and/or a plurality of negative electrodes, and includes a stacked cell in which the positive electrodes and the negative electrodes are stacked with solid electrolyte layers interposed therebetween, the resistance of the unit cell may be calculated by measuring the resistance for the stacked cell, and dividing the resistance by the number of the solid electrolyte layers. Note that the stacked cell includes a cell including one positive electrode and two negative electrodes, and a cell including two positive electrodes and one negative electrode. Since each of these cells includes two solid electrolyte layers, the resistance of the unit cell may be calculated by measuring the resistance of the cell as a whole, and dividing the resistance by 2.

In the all-solid battery according to the present embodiment, the pressure applied to the solid electrolyte layer is, for example, 500 kPa or less, which is significantly smaller as compared with the conventional cases where a restraining jig is used. However, since the solid-solid interface resistance is small, it is possible to smoothly cause a battery reaction. The pressure applied to the solid electrolyte layer in the all-solid battery is preferably 200 kPa or less, preferably in a state in which no restraining jig is used (under substantially no pressure), specifically, 100 kPa or less.

In general, a solid electrolyte layer is formed by performing deposition using a slurry including a solid electrolyte, a binder, and a dispersing medium, and removing the binder and the dispersing medium through calcinating. In a solid electrolyte layer produced by such a method, the adhesion between the solid electrolyte particles is low, and voids are formed in a portion where organic components such as the binder and the dispersing medium have been removed. Consequently, the resistance in the solid electrolyte layer is increased, making it difficult to cause a battery reaction without performing restraint using a restraining jig. In such a solid electrolyte layer, the residues of the organic components remain even after calcinating. With the all-solid battery according to the present embodiment, in the step of forming a solid electrolyte layer, a solid electrolyte layer can be formed by a dry process, without using a binder (or with a very small amount of a binder, if used). In addition, through pressurization of the electrode group or the battery, the electrode active material particles and the solid electrolyte particles can be brought into close contact with each other at an interface between the solid electrolyte particles, or between the solid electrolyte layer and the electrodes. Thus, the resistance of the unit cell can be suppressed low.

In a preferred embodiment, at least one of the positive electrode and the negative electrode is formed using an inorganic solid electrolyte. Since the positive electrode and/or the negative electrode includes an inorganic solid electrolyte, it is possible to further increase the adhesion between the active material particles and the solid electrolyte particles, and the adhesion between the positive electrode and/or the negative electrode and the solid electrolyte layer, when pressurizing the electrode group or the battery. Accordingly, it is possible to further reduce the solid-solid interface resistance in the electrode group.

The all-solid battery according to the present embodiment and the method for producing the same will be described in further detail.

(Solid Electrolyte Layer)

The solid electrolyte layer interposed between the positive electrode and the negative electrode includes an ion-conductive inorganic solid electrolyte. When pressurizing the electrode group or the battery, the solid electrolyte particles are plastically deformed, thus making it possible to bring the solid electrolyte particles into close contact with each other. In addition, the solid electrolyte particles present in the vicinity of the surface of the solid electrolyte layer are plastically deformed, thus making it also possible to increase the adhesion between the solid electrolyte layer and the positive electrode and/or the negative electrode.

As the above-described inorganic solid electrolyte, a sulfide (also referred to as a sulfide-based solid electrolyte) and a hydride (also referred to as a hydride-based solid electrolyte) are preferable since they are easily plastically deformable. In general, hydrides include a solid electrolyte called a complex hydride. The crystal state of the solid electrolyte is not particularly limited, and may be either crystalline or amorphous. Note that "easily plastically deformable" means that, when a pressure is applied to solid electrolyte particles, the pressure (plastic deformation pressure) at which the plastic deformation of the solid electrolyte particles starts is relatively small (e.g., 500 MPa or less).

As the sulfide, a sulfide including Li and P, for example, is more preferable. Examples of the sulfide include $Li_2S$—$SiS_2$, $Li_2S$—$P_2S_5$, $Li_2S$—$GeS_2$, $Li_2S$—$B_2S_3$, $Li_2S$—$Ga_2S_3$, $Li_2S$—$Al_2S_3$, $Li_2S$—$GeS_2$—$P_2S_5$, $Li_2S$—$Al_2S_3$—$P_2S_5$, $Li_2S$—$P_2S_3$, $Li_2S$—$P_2S_3$—$P_2S_5$, LiX—$Li_2S$—$P_2S_5$, LiX—$Li_2S$—$SiS_2$, and LiX—$Li_2S$—$B_2S_3$. X is I, Br, or Cl.

Examples of the hydride include a complex hydride of lithium borohydride. Examples of the complex hydride include $LiBH_4$—LiI-based complex hydride and $LiBH_4$—$LiNH_2$-based complex hydride.

The inorganic solid electrolytes may be used alone, or in combination of two or more if necessary. In terms of the ease of adhesion between the solid electrolyte particles and the excellent ionic conductivity, a sulfide-based solid electrolyte, in particular, $Li_2S$—$P_2S_5$, LiX—$Li_2S$—$P_2S_5$ and the like are preferable.

Since the inorganic solid electrolytes as described above have high adhesion between the solid electrolyte particles, it is possible to reduce the resistance of the unit cell in the all-solid battery, without restraining the electrode group or the battery using a restraining jig (i.e., under a condition in which the pressure applied to the solid electrolyte layer or the electrodes is small). In the all-solid battery, the resistance R1 of the unit cell when the pressure applied in the thickness direction of the unit cell is 100 kPa is 90 $\Omega cm^2$ or less, preferably 80 $\Omega cm^2$ or less or 75 $\Omega cm^2$ or less, more preferably 15 $\Omega cm^2$ or less or 5 $\Omega cm^2$ or less. In this manner, the resistance of the unit cell is small even at a low pressure, it is possible to smoothly cause a battery reaction without restraining the electrode group or the battery using a restraining jig.

In the all-solid battery according to the present embodiment, the solid electrolyte layer is formed without using an organic component such as a binder and a dispersing medium (or with a very small amount of an organic component such as a binder or a dispersing medium, if used). Therefore, voids, which are formed as a result of removing an organic component such as a binder in the conventional techniques, will not be formed. Accordingly, it is possible to increase the packing density of the solid electrolyte layer, and the packing density can be increased to 90 volume % or more, for example. Such a high packing density makes it possible to further reduce the resistance of the solid electrolyte layer.

The packing density of the solid electrolyte layer can be determined, for example, in the following manner. A cross-sectional electron micrograph of a solid electrolyte layer that has been taken out from an all-solid battery is thresholded to distinguish voids from the portions other than the voids. Then, in the region of a predetermined area (e.g., 100 μm in length and 100 μm in width) of the cross-sectional micrograph, the area ratio (area %) of the portions other than the voids is determined, and this area ratio is regarded as the volume-based packing density (volume %) of the solid electrolyte layer.

If necessary, the solid electrolyte layer may include a known additive for use in a solid electrolyte layer of an all-solid battery. When forming the solid electrolyte layer, a conventional binder (organic binder) such as a resin may be used. However, the inorganic solid electrolyte has the function of a binder, and can provide high adhesion between the solid electrolyte particles, and it is therefore not necessary to use an organic binder such as a resin. In addition, it is possible to increase the packing density of the solid electrolyte layer as described above.

The thickness of the solid electrolyte layer is, for example, 10 μm or more and 200 μm or less, and may be 20 μm or more and 200 μm or less.

(Positive Electrode)

It is sufficient that the positive electrode includes a positive electrode active material, and the positive electrode may include a known component for use in a positive electrode of an all-solid battery, in addition to the positive electrode active material. From the viewpoint of increasing the ionic conductivity in the positive electrode, and reducing the resistance at the interface between the positive electrode and the solid electrolyte layer, it is preferable that the positive electrode includes an inorganic solid electrolyte that exhibits ionic conductivity, together with the positive electrode active material.

As the positive electrode active material, any material used as a positive electrode active material in an all-solid battery can be used without any particular limitation. Examples of the positive electrode active material for use in an all-solid LIB include: oxides, such as a lithium-containing oxide including cobalt, nickel, and/or manganese [e.g., lithium cobalt oxide ($LiCoO_2$), lithium nickel oxide ($LiNiO_2$), lithium manganese oxide (e.g., a spinel-type lithium manganese oxide ($LiMn_2O_4$, etc.), a lithium nickel cobalt manganese oxide ($LiNi_{1/3}Co_{1/3}Mn_{1/3}$)), $LiNi_{0.8}Co_{0.15}Al_{0.05}O_2$]; a Li-excess composite oxide ($Li_2MnO_3$—$LiMO_2$); and compounds other than oxides. Examples of the compounds other than oxides include an olivine-type compound ($LiMPO_4$) and a sulfur-containing compound ($Li_2S$ etc). Note that, in the above formulas, M represents a transition metal. The positive electrode active materials may be used alone, or in combination of two or more. In terms of ease of achieving a high capacity, a lithium-containing oxide including at least one selected from the group consisting of Co, Ni, and Mn is preferable. The lithium-containing oxide may further contain a typical metal element such as Al. Examples of the lithium-containing oxide containing Al include aluminum-containing lithium nickel cobalt oxide.

From the viewpoint of increasing the conductivity of the positive electrode, it is preferable to use a positive electrode active material having a conductivity of $10^{-3}$ S/cm or more. Among such positive electrode active materials, examples of those used in an all-solid LIB include $LiNi_{0.8}Co_{0.15}Al_{0.05}O_2$, $LiCoO_2$, $LiNi_{1/3}Co_{1/3}Mn_{1/3}$, $LiNi_{0.8}Co_{0.1}Mn_{0.1}O_2$, $LiNi_{0.6}Co_{0.2}Mn_{0.2}O_2$, and $LiNi_{0.5}Co_{0.2}Mn_{0.3}O_2$. By increasing the conductivity of the positive electrode, good charge/discharge characteristics can be achieved even when the battery is operated under atmospheric pressure without using a restraining jig.

The positive electrode active material may be coated particles obtained by coating particles made of any of the above-described materials with a metal oxide. The metal oxide may be any metal oxide having the action of suppressing the diffusion of elements at the interface between the positive electrode active material particles and the solid electrolyte particles, and may be a composite oxide. As the metal oxide, it is also possible to use an oxide such as $Al_2O_3$ or $ZrO_2$, in addition to a Li-conductive composite oxide ($Li_4Ti_5O_{12}$, $LiNbO_3$, $Li_2ZrO_3$, etc.).

The average particle size of the positive electrode active material is, for example, 3 µm or more and 20 µm or less, preferably 5 µm or more 17 µm or less.

As used herein, the average particle size is a median diameter ($D_{50}$) in a volume-based particle size distribution, as measured using a laser-diffraction particle size distribution measurement apparatus.

As the solid electrolyte, any solid electrolyte used for a solid electrolyte layer in an all-solid battery can be used without any particular limitation, as long as it exhibits the ionic conductivity corresponding to the all-solid battery. As in the case of the solid electrolyte layer, a solid electrolyte that is easily plastically deformable is preferable. Among the inorganic solid electrolytes described as the examples for the solid electrolyte layer, it is preferable to use a sulfide and/or a hydride. When the positive electrode includes a solid electrolyte that is easily plastically deformable, the solid electrolyte particles are plastically deformed when pressurizing the electrode group or the battery, thus making it possible to increase the adhesion at the interface between the positive electrode active material particles and the solid electrolyte particles. Accordingly, it is possible to further reduce the reaction resistance in the positive electrode.

The ratio of the solid electrolyte in the total amount of the positive electrode active material and the solid electrolyte is not particularly limited, but is, for example, 5 mass % or more and 40 mass % or less, preferably 10 mass % or more and 30 mass % or less, in terms of ease of ensuring the high ionic conductivity of the positive electrode.

The positive electrode may include a positive electrode current collector, and a positive electrode active material or positive electrode material mixture supported on the positive electrode current collector. A positive electrode material mixture is a mixture including a positive electrode active material and a solid electrolyte.

As the positive electrode current collector, it is possible to use any material used as the positive electrode current collector of an all-solid battery without any particular limitation. Examples of the configuration of such a positive electrode current collector include a metal foil, a plate-shaped member, and a powder aggregate, and it is also possible to use a member obtained by depositing the material of the positive electrode current collector. The metal foil may be an electrolytic foil, an etched foil, or the like.

Preferably, the positive electrode current collector has a strength sufficient to prevent the positive electrode active material layer from being undulated or torn during formation.

Examples of the material of the positive electrode current collector include materials that are stable at the redox potential of the positive electrode, including, for example, aluminum, magnesium, stainless steel, titanium, iron, cobalt, zinc, tin, and alloys thereof. For example, in an all-solid LIB, a material that does not form an alloy with lithium is used for the positive electrode current collector.

The thickness of the positive electrode current collector is, for example, 4 µm or more, and may be 5 µm or more. The thickness of the positive electrode current collector is, for example, 50 µm or less, preferably 30 µm or less, more preferably 20 µm or less. These lower limits and upper limits can be freely combined.

The thickness of the positive electrode is, for example, 50 µm or more and 200 µm or less.

(Negative Electrode)

The negative electrode includes a negative electrode active material. As the negative electrode active material, any known negative electrode active material used in an all-solid batterie can be used without any particular limitation, as long as it is capable of intercalating and deintercalating ions serving as the carrier of an electric charge according to the type of the all-solid battery. Taking an all-solid LIB as an example, examples of the negative electrode active material include a carbonaceous material capable of intercalating and deintercalating lithium ion, as well as a simple substance, an alloy, a compound of a metal or a metalloid that are capable of intercalating and deintercalating lithium ion. Examples of the carbonaceous material include graphite (natural graphite, artificial graphite, etc.), hard carbon, and amorphous carbon. Examples of the simple substance or the alloy of a metal or a metalloid include a lithium metal or alloy, and a Si simple substance. Examples of the compound include an oxide, a sulfide, a nitride, a hydride, and silicide (lithium silicide, etc.). Examples of the oxide include a titanium oxide, a lithium titanium oxide, and a silicon oxide. The negative electrode active materials may be used alone, or in combination of two or more. For example, it is possible to use a silicon oxide and a carbonaceous material in combination.

For an all-solid LIB, graphite is preferable among the negative electrode active materials, and coated particles including graphite particles and amorphous carbon that coats the graphite particles is more preferable. By using a graphite having a small degree of crystal orientation, the expansion and contraction is averaged over multiple directions, and it is therefore possible to reduce the capacity decrease when performing repeated charge/discharge. In addition, by using coated particles, the intercalation and deintercalation of lithium ion is carried out across the entire surface of the particles, making it possible to smoothly cause an interface reaction. Accordingly, it is possible to suppress the reduction in the charge/discharge capacity under an atmospheric pressure even when a restraining jig is not used.

The negative electrode may include a known component used for the negative electrode in an all-solid battery, in addition to the negative electrode active material. As in the case of the positive electrode, from the viewpoint of increasing the ionic conductivity in the negative electrode, and reducing the resistance at the interface between the negative electrode and the solid electrolyte layer, it is preferable that the negative electrode includes an inorganic solid electrolyte that exhibits ionic conductivity, together with the negative electrode active material. Such an inorganic solid electrolyte can be selected as appropriate from the materials shown as the examples for the solid electrolyte layer. When the negative electrode includes a solid electrolyte that is easily plastically deformable, the solid electrolyte particles are plastically deformed when pressurizing the electrode group or the battery, thus making it possible to increase the adhesion at the interface between the negative electrode active material particles and the solid electrolyte particles. Accordingly, it is possible to further reduce the reaction resistance in the negative electrode.

From the viewpoint of reducing the interface resistance between the solid electrolyte layer and the electrodes, and reducing the reaction resistance in the electrodes, it is preferable that at least one (preferably both) of the positive electrode and the negative electrode includes an inorganic solid electrolyte, such as a sulfide or a hydride that is easily plastically deformable.

The ratio of the solid electrolyte in the total amount of the negative electrode active material and the solid electrolyte can be selected as appropriate from the ranges described as the ratios of the solid electrolyte in the total amount of the positive electrode active material and the solid electrolyte.

The negative electrode may include a negative electrode current collector, and a negative electrode active material or negative electrode material mixture supported on the negative electrode current collector. A negative electrode material mixture is a mixture including a negative electrode active material and a solid electrolyte. Examples of the configuration of the negative electrode current collector include the configurations described for the positive electrode current collector.

Examples of the material of the negative electrode current collector include materials that are stable at the redox potential of the negative electrode, including, for example, copper, nickel, stainless steel, titanium, and alloys thereof. For example, for an all-solid LIB, a material that does not form an alloy with lithium is used for the negative electrode current collector.

The thickness of the negative electrode current collector is, for example, 4 µm or more, preferably 5 µm or more. The thickness of the negative electrode current collector is, for example, 50 µm or less, more preferably 30 µm or less, further preferably 20 µm or less. These lower limits and upper limits can be freely combined.

The thickness of the negative electrode is, for example, 50 µm or more and 200 µm or less.

Figure 1:
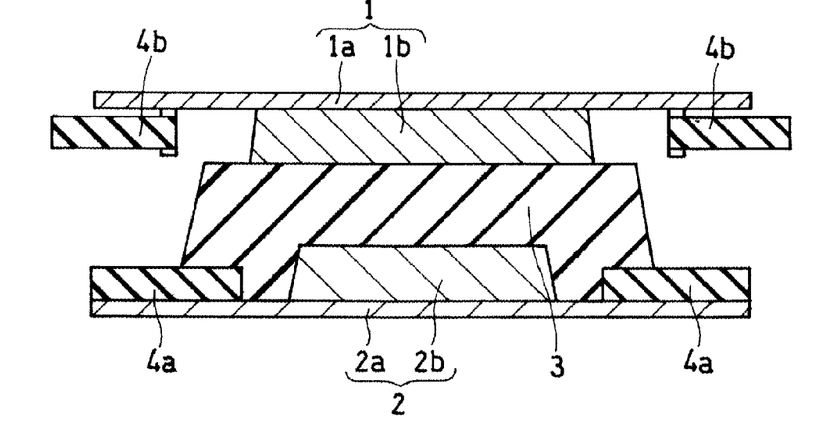
FIG. 1 is a vertical cross-sectional view schematically showing an electrode group included in an all-solid battery according to an embodiment of the present invention.

FIG. 1 is a vertical cross-sectional view schematically showing an electrode group included in an all-solid battery according to the present embodiment. The electrode group included in the all-solid battery includes a unit cell including a positive electrode 2, a negative electrode 1, and a solid electrolyte layer 3 interposed therebetween. The positive electrode 2 includes a positive electrode current collector 2a, and a positive electrode active material layer (positive electrode layer) 2b supported thereon. The negative electrode 1 includes a negative electrode current collector 1a, and a negative electrode active material layer 1b supported thereon. The positive electrode 2 and the negative electrode 1 are disposed such that the positive electrode active material layer 2b and the negative electrode active material layer 1b are opposed to each other. The solid electrolyte layer 3 is disposed between the positive electrode active material layer 2b and the negative electrode active material layer 1b. The solid electrolyte layer 3 includes the above-described solid electrolyte, and a resistance R1 of the unit cell when the pressure applied in the thickness direction of the unit cell is 100 kPa is 90 Ωcm$^2$ or less.

In the illustrated example, both of the positive electrode active material layer 2b and the negative electrode active material layer 1b have a square shape having a predetermined thickness. An annular insulating layer 4a is disposed on the positive electrode current collector 2a so as to surround the periphery of the positive electrode active material layer 2b. In addition, a frame-shaped insulating layer 4b having a rectangular opening is disposed on the negative electrode current collector 1a so as to surround the periphery of the negative electrode active material layer 1b. The insulating layers 4a and 4b prevent a short circuit between the positive electrode current collector 2a and the negative electrode current collector 1a. The positive electrode current collector 2a is a square metal foil having a larger size than the positive electrode active material layer 2b. Also, the negative electrode current collector 1a is a square metal plate having a larger size than the negative electrode active material layer 1b. The solid electrolyte layer 3 is formed so as to cover an upper surface and side surfaces of the positive electrode active material layer 2b, and an upper surface and a side surface of the insulating layer 4a on the inner circumferential side.

The all-solid battery can be fabricated by housing the electrode group in a battery case. To the positive electrode and the negative electrode of the electrode group, one end portions of their respective leads are connected. The other end portions of the leads are electrically connected to external terminals that are exposed to the outside of the battery case.

The shape of the all-solid battery is not limited to that of the example shown in FIG. 1, and may be any of various types of shapes, such as a circular type, a cylindrical type, a square type, and a thin-layer flat type. The electrode group may include a plurality of positive electrodes and/or a plurality of negative electrodes. Although FIG. 1 shows a case where the positive electrode active material layer and the negative electrode active material layer have a square shape, the present invention is not limited to this case. The shapes of the constituent members of the all-solid battery can be selected as appropriate, and may be, for example, a rectangular shape, a diamond shape, a circular shape, or an oval shape.

Examples of the all-solid battery according to the present embodiment include all-solid alkali metal ion batteries such as an all-solid LIB and an all-solid sodium ion battery; and all-solid polyvalent ion batteries such as an all-solid alkaline-earth metal battery.

The all-solid battery according to the present embodiment can be formed by a production method including the steps of forming an electrode group, and pressurizing the electrode group. In the following, each of the steps will be described.

(Step of Forming Electrode Group)

In the step of forming an electrode group, a solid electrolyte layer is formed by using an ion-conductive inorganic solid electrolyte by a dry process. When forming the solid electrolyte layer, it is preferable to distribute the electrolyte as uniformly as possible.

The step of forming an electrode group may include, for example, a step of forming a solid electrolyte layer by a dry process, and a step of separately preparing (or forming) a positive electrode and a negative electrode. The order of the steps is not particularly limited. For example, it is possible to form one (first electrode) of a positive electrode and a negative electrode, form a solid electrolyte layer on a principal surface of the first electrode, and form the other electrode (second electrode) on a principal surface of the first electrode on a side opposite to the solid electrolyte layer. Alternatively, it is possible to form an electrode group by forming a solid electrolyte layer, forming a first electrode on one principal surface of the solid electrolyte layer, and forming a second electrode on the other principal surface. When stacking the solid electrolyte layer and the electrodes, the solid electrolyte layer and the electrodes may be composited through pressurization if necessary. In particular, in the case of forming the solid electrolyte layer first, it is preferable to stack the first electrode on the solid electrolyte layer, and composite the first electrode and the solid electrolyte layer by pressurizing the stack in the thickness direction. After the solid electrolyte layer and the first electrode have been composited, it is possible to reverse the stacked product, and form a second electrode on the solid electrolyte layer on a side opposite to the first electrode.

In a preferred embodiment, first, a solid electrolyte layer is formed by using an ion-conductive inorganic solid electrolyte on a principal surface of one of a positive electrode and a negative electrode. Then, the other electrode is formed on a principal surface (principal surface on a side opposite to the one electrode) of the formed solid electrolyte layer. In this manner, an electrode group is formed. In the present embodiment, one electrode is formed before forming an electrode group.

The positive electrode can be obtained, for example, by depositing a positive electrode active material or a positive electrode material mixture, followed by compression molding. The positive electrode may also be formed by forming a layer of the positive electrode active material or the positive electrode material mixture on the surface of the positive electrode current collector. The negative electrode can be fabricated in the same manner as in the case of the positive electrode, using a negative electrode active material or a negative electrode material mixture, and a negative electrode current collector if necessary. The pressure applied during compression molding is, for example, 1 MPa or more and 4 MPa or less.

The solid electrolyte layer can be formed by a dry process using a mixture (e.g., a mixture including a solid electrolyte, an additive, etc.) including the above-described solid electrolyte or the solid electrolyte on one principal surface of one electrode, followed by compression molding. The pressure applied during compression molding is, for example, 1 MPa or more and 4 MPa or less. As described above, in the step of forming a solid electrolyte layer, it is preferable that an organic component (especially, a binder), including, for example, an organic binder such as a resin and a dispersing medium, is not used.

When forming each of the electrodes and the solid electrolyte layer, the deposition may be performed using, for example, a mask having an opening having the desired shape, if necessary.

When the electrode group includes a plurality of positive electrodes and/or negative electrodes, and a plurality of solid electrolyte layers, the electrodes and the solid electrolyte layers may be stacked such that the solid electrolyte layer is interposed between the positive electrode and the negative electrode.

(Step of Pressurizing Electrode Group)

A pressure is applied to the formed electrode group such that the resistance R1 of the unit cell when the pressure applied in the thickness direction of the unit cell in the all-solid LIB is 100 kPa is within any of the above-described ranges. The electrode group is housed in a battery case, and the application of a pressure to the electrode group may be performed before the electrode group is housed in the battery case, or after the electrode group has been housed in the battery case. For example, when the battery case is made of a laminate film or the like, the electrode group may be pressurized together with the battery case (i.e., the battery) after the electrode group has been housed in the battery case.

The pressure applied during pressurization of the electrode group may be any pressure higher than the pressure at which the above-described solid electrolyte used for the solid electrolyte layer is plastically deformed, and is preferably a pressure exceeding 500 MPa (e.g., exceeding 500 MPa and 1500 MPa or less), more preferably 800 MPa or more and 1500 MPa or less, or 800 MPa or more and 1200 MPa or less. By applying such a pressure to the electrode group (or the battery), the solid electrolyte particles included in the solid electrolyte layer are plastically deformed, to bring the particles into close contact with each other, thus making it possible to reduce the interface resistance. Furthermore, as a result of the plastic deformation of the solid electrolyte particles, the adhesion between the solid electrolyte layer and the positive electrode and/or the negative electrode can be increased. Accordingly, even when a restraining jig is not used as in the conventional techniques, it is possible to reduce the interface resistance in the electrode group, and perform charge/discharge of the all-solid battery.

EXAMPLES

Hereinafter, the present invention will be specifically described by way of examples and comparative examples. However, the present invention is not limited to the following examples.

Example 1

(1) Fabrication of All-Solid Battery

An all-solid battery (all-solid LIB) as shown in FIG. 1 was fabricated according to the following procedure. Note that the average particle size $D_{50}$ is a median diameter in a volume-based particle size distribution, as measured using a laser-diffraction particle size distribution measurement apparatus.

(a) Fabrication of Positive Electrode 2

$LiNi_{0.8}Co_{0.15}Al_{0.05}O_2$ (average particle size $D_{50}$: 6 μm) serving as a positive electrode active material and $Li_2S$—$P_2S_5$ serving as a lithium ion-conductive solid electrolyte were mixed at a mass ratio of 7:3, to give a mixture. Note that the plastic deformation pressure of the aforementioned solid electrolyte is 200 MPa.

A mask having an opening of 20 mm in length and 20 mm in width was disposed on one side of an aluminum foil of 40 mm in length, 40 mm in width, and 15 μm in thickness, serving as a positive electrode current collector 2a. A positive electrode active material layer 2b was formed by a dry process. Specifically, a predetermined amount of the above-described mixture was deposited so as to cover the opening of the mask, followed by pressurization at a pressure of 2 MPa in the thickness direction using a single-acting press, to form a positive electrode active material layer 2b. The thickness of the positive electrode active material layer 2b was 150 Note that the deposition amount of the mixture was adjusted such that the battery capacity was 2 mAh/cm².

(b) Fabrication of Solid Electrolyte Layer 3

A mask having an opening with a size of 22 mm in length and 22 mm in width, from which an upper surface of the positive electrode active material layer 2b and an upper surface of the insulating layer 4a on the inner circumferential side were exposed, was disposed on the positive electrode active material layer 2b side of the positive electrode 2, followed by a dry process, to form a solid electrolyte layer 3. Specifically, a predetermined amount of $Li_2S$—$P_2S_5$ serving as a lithium ion-conductive solid electrolyte was deposited so as to cover the opening of the mask, followed by pressurization at a pressure of 2 MPa in the thickness direction using a single-acting press, to form a solid electrolyte layer 3. At this time, the solid electrolyte layer 3 was formed so as to cover an upper surface and side surfaces of the positive electrode active material layer 2b, and an upper surface and a side surface of the insulating layer 4a on the inner circumferential side. The thickness of the solid electrolyte layer 3 was 360 Note that the plastic deformation pressure of the aforementioned solid electrolyte was 200 MPa.

(c) Fabrication of Negative Electrode 1

A negative electrode active material and $Li_2S$—$P_2S_5$ serving as a lithium ion-conductive solid electrolyte were mixed at a mass ratio of 6:4, to give a mixture. As the negative electrode active material, coated particles including natural graphite particles (average particle size $D_{50}$: about 15 μm) coated with an amorphous carbon layer were used. Note that the plastic deformation pressure of the aforementioned solid electrolyte was 200 MPa.

A mask having an opening with a size of 20 mm in length and 20 mm in width, from which the central part of the solid electrolyte layer 3 was exposed, was disposed on the solid electrolyte layer 3, followed by a dry process, to form a negative electrode active material layer 1b. Specifically, a predetermined amount of the above-described mixture was deposited so as to cover the opening of the mask, followed by pressurization at a pressure of 2 MPa in the thickness direction using a single-acting press, to form a negative electrode active material layer 1b. The thickness of the negative electrode active material layer 1b was 200 μm. Note that the deposition amount of the mixture was adjusted such that the ratio (A/C ratio) of the capacity of the negative electrode to the capacity of the positive electrode of the battery was 1.2.

A Cu foil of 40 mm in length, 40 mm in width, and 15 μm in thickness, serving as the negative electrode current collector 1a, was stacked on the negative electrode active material layer 1b. At the peripheral edge of one side of the negative electrode current collector 1a, an annular insulating layer 4b was disposed so as to be opposed to the insulating layer 4a. The opening of the insulating layer 4b was a square shape of 32 mm in length and 32 mm in width. Then, the insulating layer 4a and the insulating layer 4b were bonded with adhesive tape, to form an electrode group.

(d) Assembly of Battery

The electrode group obtained in (c) above was inserted into a battery case made of a laminate film and including a negative electrode lead and a positive electrode lead, and the battery case was hermetically sealed by being thermally fused, while the gas inside the battery case was being sucked with a vacuum pump. At this time, the positive electrode lead and the negative electrode lead were electrically connected to the positive electrode current collector 2a and the negative electrode current collector 1a, respectively. Thereafter, a pressure of 980 MPa was applied to the electrode group, together with the battery case, in the thickness direction of the electrode group, to fabricate an all-solid LIB (unit cell).

(2) Evaluation (a) Resistance of Unit Cell

For the all-solid LIB obtained in (1) above, the resistances R1 and R2 of the unit cell were determined according to the above-described procedure. As the frequency response analyzer, a SI1260-type analyzer from Solartron Metrology was used.

(b) Discharge Capacity and Capacity Retention Rate After Cycle Charge/Discharge of All-Solid LIB Using the all-solid LIB obtained in (1) above, the discharge capacities under pressure and under no pressure, and the capacity retention rate after 100 cycles of charge/discharge were measured in the following manner.

The all-solid LIB was disposed in a constant-temperature bath at 25° C., and was subjected to constant current charge with a current density of 0.1 C under atmospheric pressure (0.1 MPa), while maintaining the temperature, until an end-of-charge voltage of 4.0 V was reached. The all-solid LIB was then subjected to constant current discharge with a current density of 0.1 C until an end-of-discharge voltage of 2.7 V was reached, and the discharge capacity at this time (initial discharge capacity) was determined. The initial discharge capacity was determined for both a state (under pressure) in which the electrode group was pressurized at a pressure of 60 MPa in the thickness direction of the unit cell, and a state (under no pressure) in which the electrode group was not pressurized. In addition, in a state in which the unit cell is not pressurized, the discharge capacity after repeating 100 cycles of the above-described charge/discharge was determined, and the ratio (%) to the initial discharge capacity under no pressure defined as 100% was calculated as the capacity retention rate.

Example 2

As the positive electrode active material, $LiCoO_2$ particles (average particle size $D_{50}$: 12.4 μm) coated with $Li_4Ti_5O_{12}$ were used. Except for this, an all-solid LIB was fabricated and evaluated in the same manner as in Example 1.

Example 3

As the positive electrode active material, $LiNi_{1/3}Co_{1/3}Mn_{1/3}$ particles (average particle size $D_{50}$: 7.2 μm) coated with $Li_4Ti_5O_{12}$ were used. Except for this, an all-solid LIB was fabricated and evaluated in the same manner as in Example 1.

Example 4

As the negative electrode active material, coated particles including natural graphite particles (average particle size $D_{50}$: about 15 μm) coated with an amorphous carbon layer having a thickness of 20 nm were used. Except for this, an all-solid LIB was fabricated and evaluated in the same manner as in Example 1.

Example 5

As the solid electrolyte, LiX—$Li_2S$—$P_2S_5$ (X=Br) was used. Except for this, an all-solid LIB was fabricated and evaluated in the same manner as in Example 1.

Example 6

As the solid electrolyte, LiX—$Li_2S$—$P_2S_5$ (X=Cl) was used. Except for this, an all-solid LIB was fabricated and evaluated in the same manner as in Example 1.

Comparative Example 1

As the solid electrolyte used for the solid electrolyte layer, the positive electrode active material layer, and the negative electrode active material layer, a $Li_2S$—$SiS_2$-based solid electrolyte undergoing elastic deformation at 500 MPa was used. Except for this, an all-solid LIB was fabricated and evaluated in the same manner as in Example 1.

The results of Examples 1 to 6 and Comparative Example 1 are shown in Table 1. Examples 1 to 6 correspond to A1 to A6, and Comparative Example 1 corresponds to B1.

TABLE 1

|    | Under pressure | | Under no pressure | | | |
| --- | --- | --- | --- | --- | --- | --- |
|    | Resistance R2 ($\Omega cm^2$) | Discharge capacity (mAh) | Resistance R1 ($\Omega cm^2$) | R1 increase rate (%) | Discharge capacity (mAh) | Capacity retention rate (%) |
| A1 | 66.7  | 9.7 | 68.1  | 2.0  | 9.5 | 95.8 |
| A2 | 61.2  | 8.3 | 66.4  | 8.5  | 8.0 | 91.5 |
| A3 | 64.0  | 8.1 | 70.1  | 9.6  | 7.6 | 90.3 |
| A4 | 67.9  | 9.3 | 74.0  | 3.3  | 9.0 | 95.5 |
| A5 | 9.1   | 9.0 | 9.2   | 1.2  | 8.8 | 91.4 |
| A6 | 2.8   | 8.6 | 3.0   | 5.3  | 8.6 | 98.3 |
| B1 | 115.2 | 7.4 | 129.0 | 13.9 | 6.9 | 41.8 |

In the examples, high discharge capacities comparable to the discharge capacities under pressure were also achieved under no pressure, and the capacity retention rates were also high. The reason is presumably that solid electrolytes undergoing plastic deformation at a pressure smaller than the pressure applied during pressurization of the electrode group were used in the examples, so that the solid electrolytes acted as a binder, thus reducing the interface resistance between the solid electrolyte particles, and the interface resistance between the solid electrolyte and the positive and negative electrodes. On the other hand, in Comparative Example 1, a relatively high discharge capacity was obtained under pressure, but the discharge capacity was significantly reduced under no pressure, as compared with the discharge capacity under pressure. The reason is presumably that a solid electrolyte undergoing elastic deformation (not undergoing plastic deformation) at a pressure applied during pressurization of the electrode group was used in Comparative Example 1, so that the interface resistance was reduced to some extent under pressure, but a portion of the solid electrolyte particles caused spring back during measurement, resulting in a reduced adhesion and hence an increased interface resistance.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

An all-solid battery according to the present invention can increase the energy density, and is therefore useful in various applications for which a high energy density is required.

REFERENCE SIGNS LIST

1 . . . Negative electrode
2 . . . Positive electrode
1a . . . Negative electrode current collector
1b . . . Negative electrode active material layer
2a . . . Positive electrode current collector
2b . . . Positive electrode active material layer
3 . . . Solid electrolyte layer
4a, 4b . . . Insulating layer

The invention claimed is:

1. An all-solid battery comprising:
at least a unit cell including a positive electrode, a negative electrode, and an ion-conductive solid electrolyte layer interposed between the positive electrode and the negative electrode,
wherein the all-solid battery is a solid lithium-ion battery,
wherein the positive electrode includes a positive electrode active material and an inorganic solid electrolyte,
wherein the negative electrode includes a negative electrode active material and an inorganic solid electrolyte,
wherein the solid electrolyte layer includes an inorganic solid electrolyte,
wherein the positive electrode active material includes a lithium-containing oxide including at least one selected from the group consisting of Co, Ni, and Mn,
wherein the negative electrode active material includes at least one selected from the group consisting of a material structured to intercalate and deintercalated lithium ions, and a material containing Si,
wherein each of the inorganic solid electrolyte in the positive electrode and the negative electrode includes plastically deformed particles of a sulfide-based solid electrolyte at a pressure of 800 MPa or more,
wherein the inorganic solid electrolyte in the solid electrolyte layer includes plastically deformed particles of a sulfide based solid electrolyte at a pressure of 800M Pa or more, and
wherein a part of the plastically deformed particles in the solid electrolyte layer is deformed together with a part of the plastically deformed particles included in each of the inorganic solid electrolyte in the positive electrode and the negative electrode
such that a resistance R1 of the unit cell when a pressure applied in a thickness direction of the unit cell is 100 kPa as small as 90 $\Omega cm^2$ or less, and a resistance R2 is a resistance of the unit cell when a pressure applied in the thickness direction is 60 MPa, produce an increase rate represented by (R1–R2)/R2×100 of 10% or less, and
wherein a pressure applied to the solid electrolyte layer is 100 kPa or less in the all-solid battery.

2. The all-solid battery according to claim 1, wherein the resistance R1 is 75 $\Omega cm^2$ or less.

3. A method for producing an all-solid battery, comprising the steps of:
forming an electrode group including at least a unit cell including a positive electrode, a negative electrode, and a solid electrolyte layer being interposed between the positive electrode and the negative electrode and including an ion-conductive inorganic solid electrolyte; and
pressurizing the electrode group to plastically deform the inorganic solid electrolyte,
wherein the all-solid battery is a solid lithium-ion battery,
wherein the step of forming the electrode group includes a sub-step A of forming one member A selected from the group consisting of the positive electrode, the negative electrode, and the solid electrolyte layer by use of compression molding under a pressure of 1 MPa or more and 4 MPa or less, a sub-step B of forming one member B selected from of rest of the group on the member A by use of compression molding under a pressure of 1 MPa or more and 4 MPa or less, and a sub-step C of forming one member C which is rest of the group on the member A or the member B by use of compression molding under a pressure of 1 MPa or more and 4 MPa or less, wherein, in the step of forming the electrode group, the solid electrolyte layer is formed by using the inorganic solid electrolyte by a dry process, wherein a pressure applied during the pressurizing the electrode group is 800 MPa or more, wherein the positive electrode includes a positive electrode active material and an inorganic solid electrolyte, wherein the negative electrode includes a negative electrode active material and an inorganic solid electrolyte, wherein each of the inorganic solid electrolyte in the positive electrode and the negative electrode includes plastically deformed particles of a sulfide-based solid electrolyte at a pressure of 800 MPa or more after the pressurizing the electrode group, wherein the inorganic solid electrolyte in the solid electrolyte layer includes plastically deformed particles of a sulfide-based solid electrolyte at a pressure of 800 MPa or more, and a part of the plastically deformed particles in the solid electrolyte layer is deformed together with a part of the plastically deformed particles included in each of the inorganic solid electrolyte in the positive electrode and the negative electrode, after the pressurizing the electrode group, such that a resistance R1 of the unit cell when a pressure applied in a thickness direction of the unit cell is 100 kPa as small as 90 $\Omega cm^2$ or less, and a resistance R2 is a resistance of the unit cell when a pressure applied in the thickness direction is 60 MPa, produce an increase rate represented by (R1−R2)/R2×100 of 10% or less, and wherein a pressure applied to the solid electrolyte layer is 100 kPa or less in the all-solid battery.

4. The method for producing an all-solid battery according to claim 3, wherein the solid electrolyte layer is formed without using an organic binder.

* * * * *